Jan. 17, 1961 J. G. DRESSER 2,968,407

STORAGE FILE FOR UNFOLDED CODED TAPE

Filed June 25, 1958 2 Sheets-Sheet 1

INVENTOR.
JASPER GILBERT DRESSER
BY [signature]
ATTORNEY

STORAGE FILE FOR UNFOLDED CODED TAPE

Filed June 25, 1958 2 Sheets-Sheet 2

INVENTOR.
JASPER GILBERT DRESSER
BY
ATTORNEY 2,968,407

STORAGE FILE FOR UNFOLDED CODED TAPE

Jasper Gilbert Dresser, Boynton Beach, Fla., assignor to Dresser Products Incorporated, a corporation of Rhode Island Filed June 25, 1958, Ser. No. 744,392

4 Claims. (Cl. 211—61)

The present invention relates to improvements in storage files and more particularly to an improved storage file for storing unfolded coded tape.

With the increasing use of coded tape for commercial and industrial applications, storage of the coded tape has become an ever increasing problem, both temporary and permanent storage offering unique problems. The prior art is signally deficient as to the disclosure of suitable storage means for coded tape as used today.

In many instances, the coded tape need be stored only temporarily. For example, in telephone applications, the coded tape recording calls made, such as long distance dial calls, is retained for approximately 24 hours, at the end of which time, it is destroyed. Prior to destruction, it may be necessary to refer to the coded tape and a suitable means for temporary filing is necessitated whereby the coded tape easily can be singled out for decoding and usage prior to return to the storage file. A storage file suitable for the problems inherent in telephone and like applications must be so designed as to provide free access to the individual tapes, easy visibility of the tape being stored, easy disposal of the tape after retention for any given period, and ready mobility of the file as a whole.

In view of the foregoing, it is a primary object of the present invention to provide an improved storage file for storing unfolded coded tape which will fufill the need created by present day usage of coded tape.

Another object of the present invention is to provide an improved storage file for unfolded coded tape which will be suitable for temporary storage of such tape and easy disposal of the tape when no longer needed.

A further object of the present invention is to provide an improved storage file for unfolded coded tape whereby the tape can be filed in such a manner as to expose an end portion thereof which identifies the tape contents.

Still another object o fthe present invention is to provide an improved storage file for unfolded coded tape wherein the coded tape can be easily inserted manually into the file for storage, and after usage, all of the tape can easily be dislodged from the file into a wastebasket or the like.

Still another object of the present invention is to provide an improved storage file for coded tape whereby the necessity for folding the tape is obviated.

Various other objects and advantages will become apparent from the detailed description to follow.

Figures 1, 2, 3:
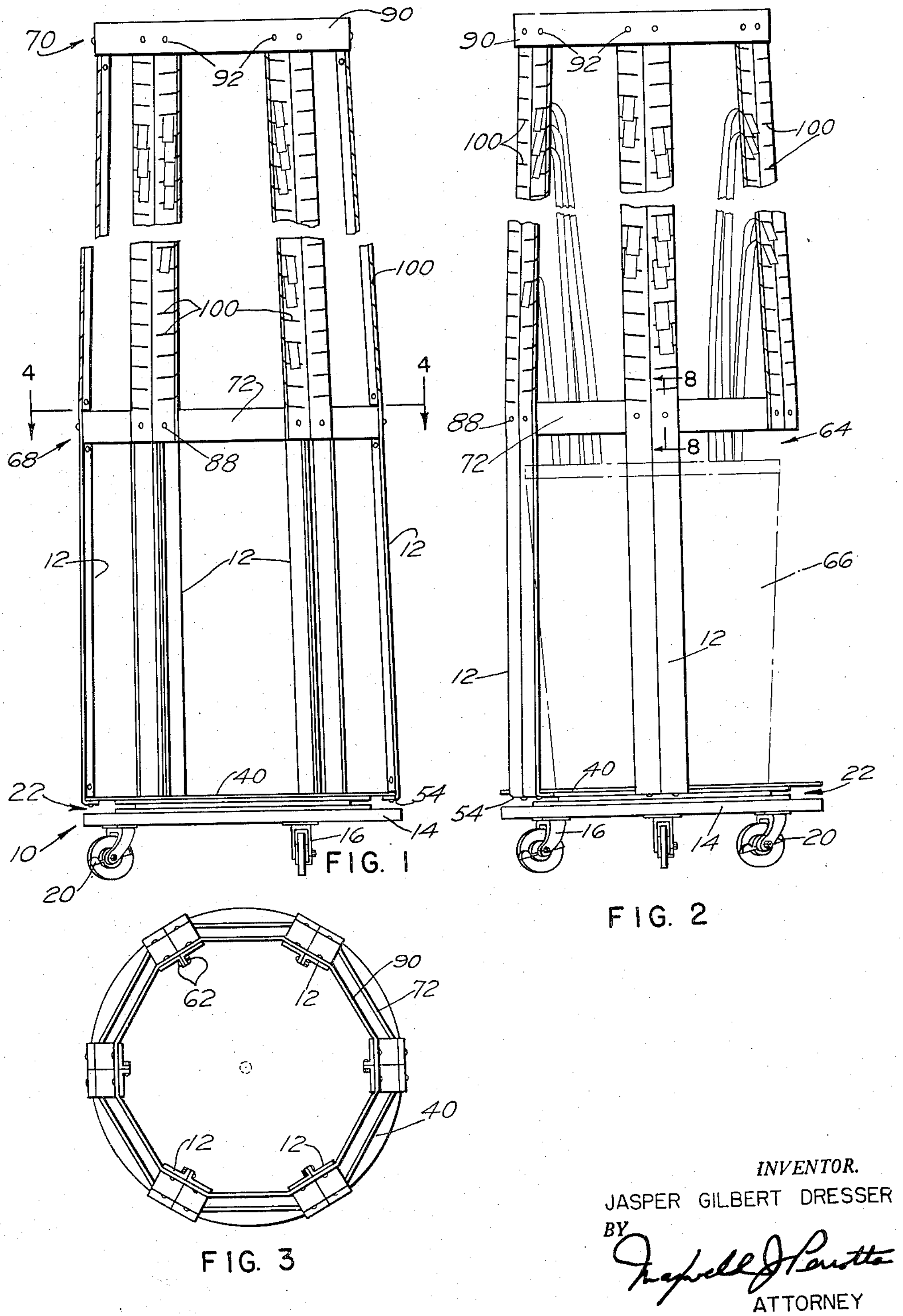
Figure 1 is a front elevational view of my improved storage file.
Figure 2 is a side elevational view of the storage file of Figure 1.
Figure 3 is a top plan view of the storage file of Figure 1.

Referring more particularly to the drawings, wherein like numerals apply to like parts, and having particular reference to Figures 1 and 2, it will be seen that the storage file is comprised of a base construction 10 which carries the plurality of pairs of storage file bars 12.

Figure 9:
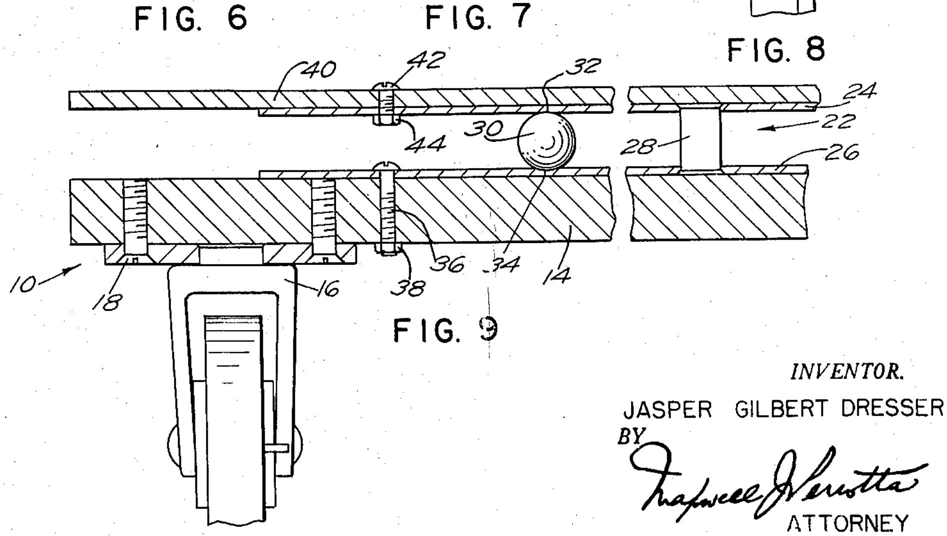
Figure 9 is an enlarged detail sectional view through a portion of the base of the storage file showing the bearing construction and caster assembly.

Figures 1, 2, and 9 show the base construction 10 to be comprised of a rotatable platform 14, to the underside of which are fixedly secured a plurality of casters 16 by the screws 18. The casters 16 are of the type having lock levers 20, the entire caster assembly being conventional, as is well known. The platform 14 has a bearing assembly 22 secured thereto. The bearing assembly 22 includes upper and lower plates 24 and 26 pivotally interconnected by the pivot 28 and having a plurality of ballbearings 30 therebetween received in the races 32 and 34 of the plates 24 and 26, respectively. The lower plate 26 is secured to the platform 14 by means of the bolts 36 and nuts 38 while the upper plate 24 is secured to the base plate 40 by a plurality of bolts and nuts 42, 44. The base plate 40 has four pairs of file bars connected thereto so as to be substantially vertically disposed and perpendicular to the base plate.

Figure 5:
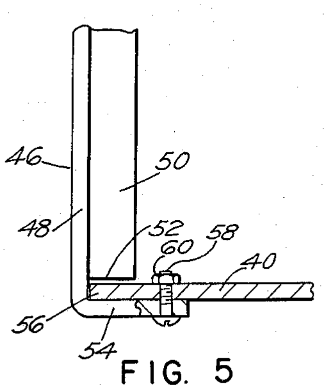
Figure 5 is an enlarged detailed sectional view showing the manner in which the vertical bars are connetced to the base of the storage file.

As shown in Figure 5, one of the file bars 46 is disclosed as including a main body portion 48 and a web portion 50, the body portion and web portion being provided by the use of angular stock. The lower end of each bar 46 has its web portion 50 cut away as at 52, and an end portion of the body portion 48 is laterally bent as at 54 so as to underlie the base plate 40. The periphery 56 of the base plate is received beneath the lower edge of the web 50 as shown. The laterally bent portion 54 is secured to the base plate 40 by means of the bolt 58 and nut 60.

Figure 4:
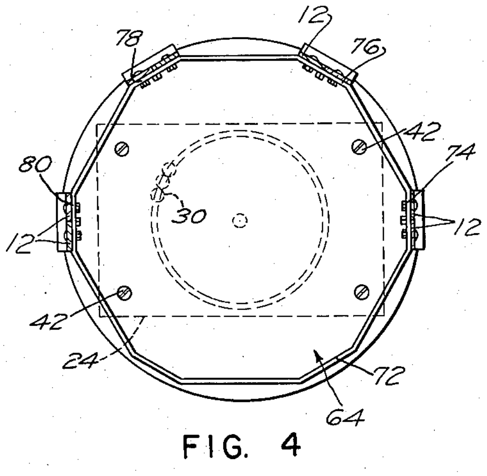
Figure 4 is a horizontal sectional view taken substantially along the plane of line 4—4 in Figure 1.

As shown in Figures 3 and 4, the file bars 46 are provided in pairs which are disposed in back-to-back relationship with the webs 50 thereof being joined together by bolt and nut assemblies 62. The four pairs of file bar assemblies 12 are disposed circumferentially around the base plate 40 in such a manner as to leave a substantial opening at 64 as shown in Figures 2 and 4. The opening 64 provides for easy insertion and removal of the wastebasket shown in dotted lines at 66.

Figure 8:
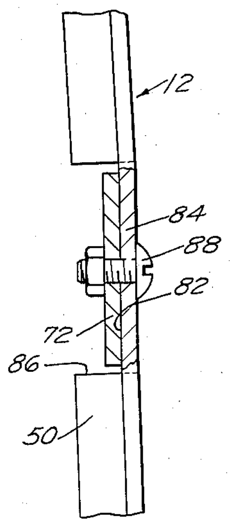
Figure 8 is an enlarged detail sectional view taken substantially along the plane of line 8—8 in Figure 2.

In order to support the file bar assemblies above the base plate 40, a pair of ring assemblies are provided at 68 and 70. The ring assembly at 68 is best shown in Figures 1, 2, 4, and 8 as comprising a multisided ring 72 which is formed with flats at 74, 76, 78, and 80. The flats 74, 76, 78, 80 are adapted to receive thereagainst the rear surfaces 82 of the file bar medial portions 84, as shown in Figure 8. The file bars have their web portions 50 cut away as at 86 so as to permit abutment of the ring 72 against the main body portion 84 of the file bars. Bolt and nut assemblies 88 are utilized for connecting the vertically disposed file bars to the ring 72.

The upper ring assembly 70 includes a continuous ring 90 which encircles the upper ends of the file bars and is connected thereto by a plurality of pairs of bolts and nuts, as at 92. The ring 90 is of a diameter smaller than that of the base plate 40 so as to draw the upper ends of the file bars inwardly. The ring 72 is larger than the ring 90 but smaller than the base plate 40 so that the file bars taper outwardly from the upper ring 90 and then bow slightly after the ring 72 and toward the periphery of the base plate 40.

Figure 6:
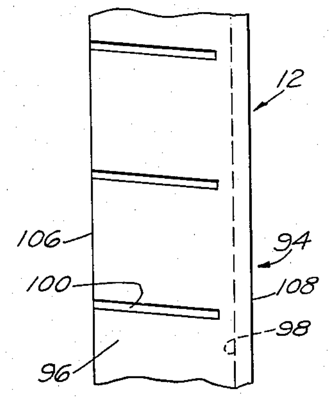
Figure 6 is a front elevational view of an enlarged section of one of the storage bars.
Figure 7:
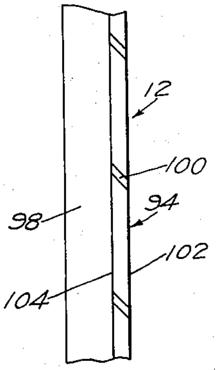
Figure 7 is a side elevational view of the bar of Figure 6.

Figures 6 and 7 show details of the file bars. The file bar portion 94, shown in Figures 6 and 7, includes a main body portion 96 and an angularly extending web portion 98 integral therewith, the file bar being made from conventional angular stock. The web portion 98 is provided for joinder in back-to-back relationship with a cooperative file bar as hereinbefore described. The main body portion 96 is formed with a plurality of slot formations 100. The slot formations provide slots each of which is approximately 1/16 of an inch wide and approximately 1 inch long. The slot extends from the outer face 102 to the rear face 104 and it is inclined downwardly from the rear face to the front face so that when the tape is recived therein it will be bent downwardly on the outside of the file. The slots 100 extend in from the side edge 106 and are inclined downwardly toward the opposite side edge 108 so that when the tape is engaged therein it will tend to be so retained under its own weight. The rear to front inclination of the slot is approximately 45° whereas the edge-to-edge inclination of the slot is approximately 5°. These angles are found to be particularly desirable for holding coded tape of the type involved.

From the foregoing, it will be seen that the storage file can be wheeled from place to place by using the casters 20. Upon moving the file to the desired location, the casters can be locked and the operator using tape from the file can remove the tape as desired and rotate the file on the bearing assembly to find the desired tape.

In storing tape in the file, the coded end of the tape which carries the information identifying the contents of the tape is passed through the end of the slot at the edge 106 of the file bar to the position shown in Figures 1 and 2. The inclination of the slot will hold the free end of the tape externally of the file downwardly while the main body of the tape will dangle into the wastebasket 66. When it is desired to use a tape stored in the file, the operator locates the tape by looking at the ends exposed externally of the file and then removes the same by sliding it laterally out of the slot. When the operator is through using the tape it is returned to its slot and when the tapes stored in the file are no longer needed, the tapes are easily brushed into the wastebasket by a simple manual operation sliding the tapes out of their respective slots. Thereafter, the wastebasket containing the used tape can be removed and the tape burned.

From the foregoing, it is believed that I have provided a construction which fulfills the objects hereinbefore enumerated.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall with the metes and bounds of the claims or that form their functional as well as conjointly cooperative equivalents, are therefore intended to be embraced by these claims.

I claim:

1. A storage file for unfolded coded tape comprising at least one bar adapted to be supported in an upright position so as to provide upper and lower ends, said bar having relatively wide front and rear surfaces and relatively narrow side edges, said bar having a plurality of slot formations therein throughout at least a portion of its length, each of said slot formations extending from back to front through said bar and being inclined upwardly from the front surface to the rear surface so that the surface edges thereof are out of alignment, and each of said slot formations opening out at one side edge of said bar, each of said slot formations extending in from said one side edge and being inclined toward said lower end whereby tape may be received in said slot formations from the side edge of said bar.

2. A storage file for unfolded coded tape comprising a frame, said frame including a plurality of circumferentially spaced bars of rectangular cross-section substantially vertically disposed with said frame in its upright position, said frame having a base and said bars being disposed circumferentially of said base and spaced upwardly thereof, each of said bars having relatively wide front and rear surfaces and relatively narrow side edges, each of said bars having a plurality of slot formations therein throughout at least a portion of its length, each of said slot formations extending through its respective bar and being inclined upwardly from the front to the rear surface thereof, each of said slot formations opening out at one side edge of its respective bar and being inclined downwardly toward the other side edge thereof, said frame including an opening adjacent the base adapted to removably receive a basket therethrough for disposition on said base.

3. A storage file for unfolded coded tape comprising a frame, said frame including a plurality of circumferentially spaced bars adapted to be substantially vertically disposed with the frame in its upright position, each of said bars being formed of a strip of angular cross section and a pair of said bars being joined in back-to-back relationship, each of said bars having a plurality of slot formations therein, said slot formations opening out at front and rear surfaces of each bar and being elongated and opening out at a side edge of each bar so as to receive an end portion of a strip of tape, said slot formations being inclined downwardly from the rear to front surfaces of each bar so as to hold such tape end portion down.

4. A storage file for unfolded coded tape comprising a frame, said frame including a plurality of circumferentially spaced bars adapted to be substantially vertically disposed with the frame in its upright position, each of said bars being formed of a strip of angular cross section and a pair of said bars being joined in back-to-back relationship, each of said bars having a plurality of slot formations therein, said slot formations opening out at front and rear surfaces of each bar and being elongated and opening out at a side edge of each bar so as to receive an end portion of a strip of tape, said slot formations being inclined downwardly from the rear to front surfaces of each bar so as to hold such tape end portion down, and each of said slot formations extending in from said one side edge and being inclined downwardly toward the other side edge.

References Cited in the file of this patent

UNITED STATES PATENTS

| | | |
|---|---|---|
| D. 85,303 | Peterson | Oct. 6, 1931 |
| 905,578 | Read | Dec. 1, 1908 |
| 1,194,436 | Smith | Aug. 15, 1916 |
| 2,598,614 | Gilbert | May 27, 1952 |
| 2,865,122 | Clawson | Dec. 23, 1958 |